UNITED STATES PATENT OFFICE.

PAUL KESTNER, OF LILLE, FRANCE, ASSIGNOR TO KESTNER EVAPORATOR COMPANY, OF PHILADELPHIA PENNSYLVANIA, A CORPORATION OF PENNSYLVANIA.

EVAPORATING APPARATUS.

1,028,738.          Specification of Letters Patent.      Patented June 4, 1912.

Application filed August 22, 1911. Serial No. 645,427.

*To all whom it may concern:*

Be it known that I, PAUL KESTNER, a citizen of the Republic of France, residing at Lille, Department of Nord, France, have invented certain new and useful Improvements in Evaporating Apparatus, of which the following is a specification.

This invention relates to evaporating apparatus; and it comprises a multiple-liquid passage evaporating device having a plurality of sets of evaporating tubes within a common heating casing and means whereby said sets may be operated independently or successively, and, more specifically, it comprises an evaporator or effect of the climbing film type having a plurality of sets of evaporating tubes for the ascent of liquid therein, located and inclosed within a common heating jacket or casing with connecting means allowing successive or independent operation of the several sets; and it also comprises a combination of an evaporator or effect of the type described with other evaporators or effects in multiple effect arrangement, said evaporator forming one or more effects in said arrangement; all as more fully hereinafter set forth and as claimed.

In multiple effect evaporators of the traveling film type wherein liquid is passed, so to speak, as a flowing current through a series of successively operating evaporators, the volume of the liquid of course becomes progressively less as it passes forward. And since for a variety of reasons it is desirable to have the successive evaporators or effects of about the same dimensions, with a given amount of liquid flow in the feed to the first in series, a flow which will suffice to cover the heating surfaces to a given efficient depth, the flow to the final effect will, necessarily, cover the heating surfaces therein to a less depth. This is partially but not wholly, compensated for with may liquids by the fact that the liquid in the final effect, being cooler and being more concentrated, is somewhat more viscous and flows more slowly so that it takes a longer time to pass over the heating elements; i. e., the flowing film passes more slowly. Nevertheless, the maintenance of an efficient thickness of flowing film in the final effects is a desideratum. This is particularly true in what is known as the climbing film type of evaporators where a film of liquid is caused to pass upward through a heated tube by a central column of swiftly moving vapor.

In any type of film evaporator it is in practice necessary to use in each effect a plurality of heating tubes working in parallel and fed from a common source of supply; and it is necessary that this liquid be divided with substantial equality among the several tubes. And this presents difficulties in the case of the final effect where the volume of liquid fed in is and must be materially lessened; it is difficult to keep the liquid from dividing itself unequally among the several tubes, causing some to run dry and others to take an undue quantity.

In the present invention I have provided a modified type of evaporator particularly suitable as the final effect in a multiple-effect system. As stated, it is desirable in practice that the final effect be about the same dimensions as the others. As a matter of theory, in a triple effect, approximately the same amount of evaporation, that is, production of vapors must occur in each effect; one-third of the total vaporization must occur in each effect. There should therefore be about the same area of evaporating surface; about the same area of surface exposed to heating vapors on the one side and to liquid to be concentrated on the other. And since each succeeding effect is heated by the vapors of the next preceding, there should be vapor space in the heating elements ample to accommodate the vapors from such preceding effect without back pressure. The vapors coming from each prior effect must be condensed in the heating chambers of the next effect in such a manner as to allow the desired low pressure to prevail in such prior effect. This requires ample vapor space.

In the present invention while retaining the size of the effect as a whole about the same as in the usual practice and giving it about the same total vapor space in the heating chamber and total area of evaporating surface, or of heat-transferring surface, I subdivide this area into a plurality of distinct areas and provide means whereby said areas may be used successively or independently as regards liquid to be concentrated or treated while supplying heating agent simultaneously to all said areas, using a common heating casing or jacket for the grouped heat-transferring elements or areas. In a tubular evaporator provided with a plurality of evaporating tubes inclosed in a common vapor-supplied heating casing or jacket, I group these tubes into a plurality of sets, providing each set with special delivery means for liquid, or liquid and vapor, and with a special feed means. Suitable connections allow liquid emerging from one such set to be re-delivered to another such set for passage therethrough, or allow one or more sets to be cut out of operation altogether, or to be used for independent purposes, as for preheating liquids. Where used for re-delivery, obviously since the liquid, so to speak, goes through the several groups in series instead of in parallel, for a given rate of flow into the effect the thickness of film, or covering, of liquid on the heating surfaces will be increased. Another advantage of this series feed is that the speed of flow of the liquid over the heating surfaces is greater than where the liquid is fed through the tubes in parallel. Other things being equal, the efficiency of heat transfer from a heating surface to a flowing liquid is the greater the more rapid the flow. The advantages of obtaining a more efficient thickness of film from a given limited amount of liquid are however independent of the series arrangement; and are attained when only part of the tubes instead of all are employed; i. e., when one or more groups or sets of tubes are cut out of circuit. Presuming there are two groups of tubes, the amount of liquid which running in parallel through both groups may be somewhat too little to give an efficient film will still give efficient filming if it be run through the two groups in series or if it be run through but one group. With a two-group apparatus used as an effect in a multiple effect arrangement, one group may be used to evaporate the liquid going through the multiple effect while the other is cut out altogether, not being supplied with liquid. The idle group does not absorb heat, the absorption of heat being confined to the group in operation; or, in other words, the heat of the vapor supplied to the effect is utilized wholly by the active group of tubes; that is, all the heat of the vapor supplied whether steam or vapors from a prior effect is being utilized by a limited number of tubes. On the other hand the other group instead of being idle, may be utilized for heating or evaporating a distinct liquid, as for instance where a two-group effect is used as the last effect in multiple effect: one group may be finishing the liquid delivered by the next preceding effect while another group is functioning as a pre-evaporator on liquid to be delivered to the first effect in series. With a three-group effect, two groups may be working in series and a third group functioning as a pre-evaporator; or two groups may be working on independent liquids with the third group cut out of operation; and so on.

Multiple group evaporators under the present invention may be used assembled as any or all of the several effects of a multiple effect arrangement; but are particularly advantageous as the later effects in series because of the possibility of adjusting the area of heating surface functioning at any given time to the volume of the concentrated liquid delivered by prior effects without change of the heating elements proper. The use of the multiple group evaporator as an effect in a multiple effect arrangement, and particularly as the last effect, gives the multiple effect assemblage great flexibility in operation. If all the effects in the multiple effect are the present type of multiple-group evaporator, the flexibility of the system as a whole is still more enhanced. Presuming for example that the first effect is a multiple-group evaporator, say with two groups, then one group may be used to do all the evaporation in the first effect, the other being idle, giving a rapid delivery of a large volume of, relatively, little concentrated liquid to the second effect. Or the two groups may be run in parallel, delivering a double volume of such liquid to the second effect; and so on. With all the effects of multiple-group evaporators, any effect can, within limits, be run individually; the operation of the plurality of effects is not so interdependent as with the ordinary types of multiple effects.

While the described multiple group arrangement of the evaporating tubes in a single heating casing with feed arrangements of the type described is applicable to many other types of tubular evaporators, such as "standard type" or non-filming evaporators, evaporators working with a descending film, etc., I regard it as more particularly advantageous with the ascending film type in which liquid travels upward through tubes as an annular film under the influence of a quickly moving central body of vapor.

In the accompanying illustration I have shown, more or less diagrammatically, certain embodiments of the described invention.

In this showing, Fig. 6 is a view in elevation of the effect of Fig. 1 used as a final effect and as a pre-evaporator in a triple-effect assemblage.

Figure 1:
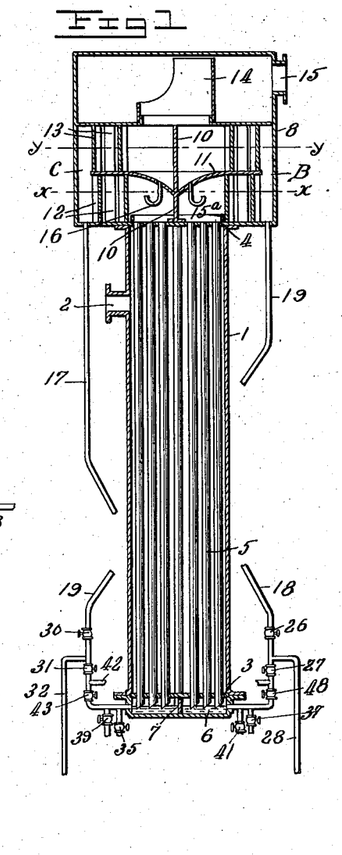
Figure 1 is a rather diagrammatic sectional view of an evaporator effect embodying the present invention and shown as of the ascending film type.
Figures 2, 3, 4, 5:
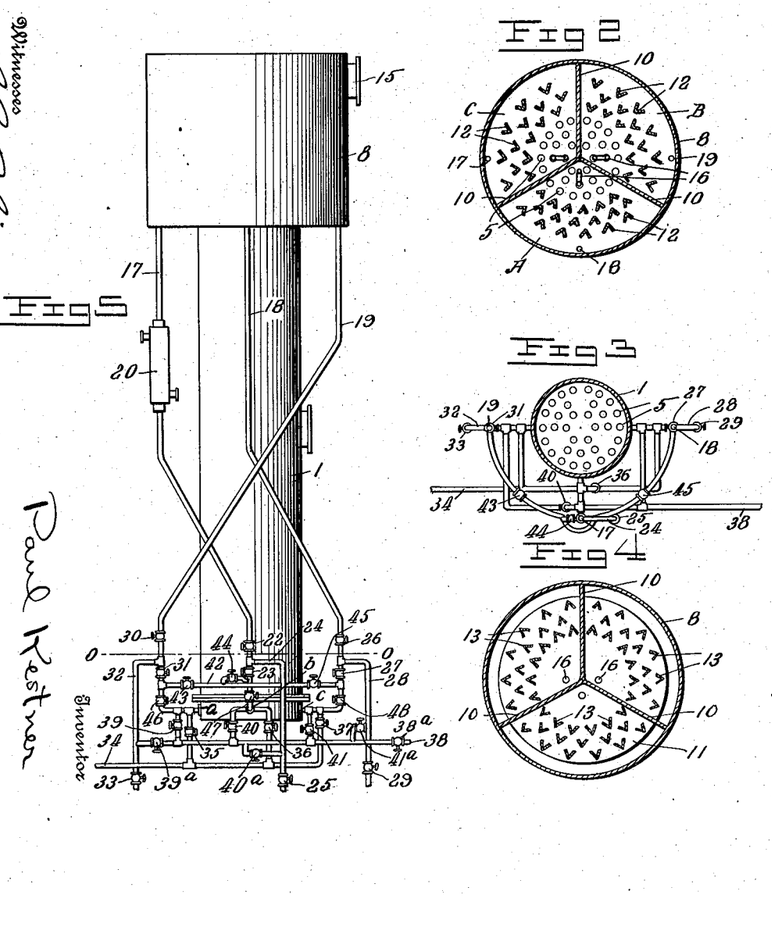
Fig. 2 is a cross section on the line x—x of Fig. 1 showing a vapor separator.
Fig. 3 is a developed view on line o—o, Fig. 5, of certain connections.
Fig. 4 is a view similar to Fig. 2 on line y—y, Fig. 1.
Fig. 5 is a view, mainly in elevation, showing the apparatus and pipe connections which may be used; the piping for clearness of illustration being shown on a smaller scale.
Figure 3:
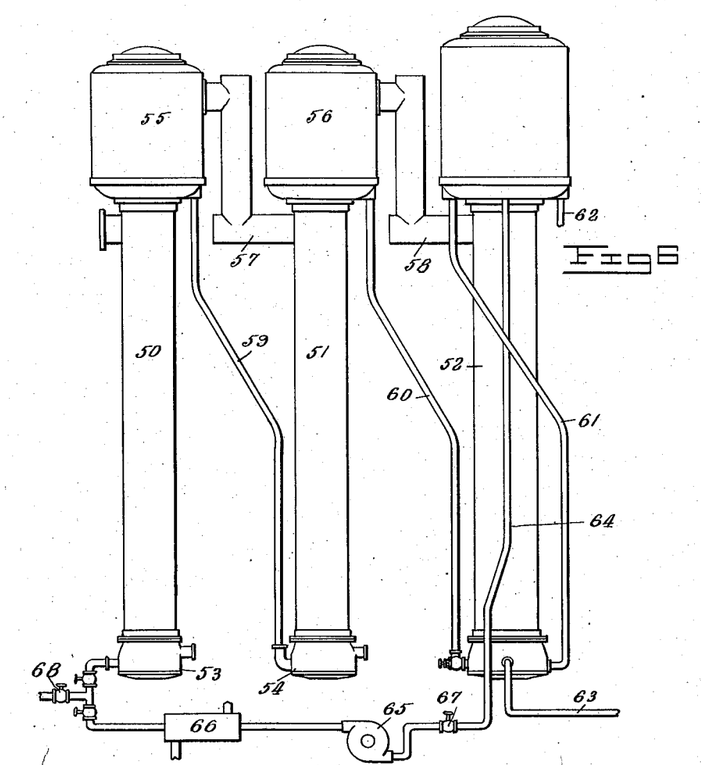
Figures 7, 8, 9, 10:
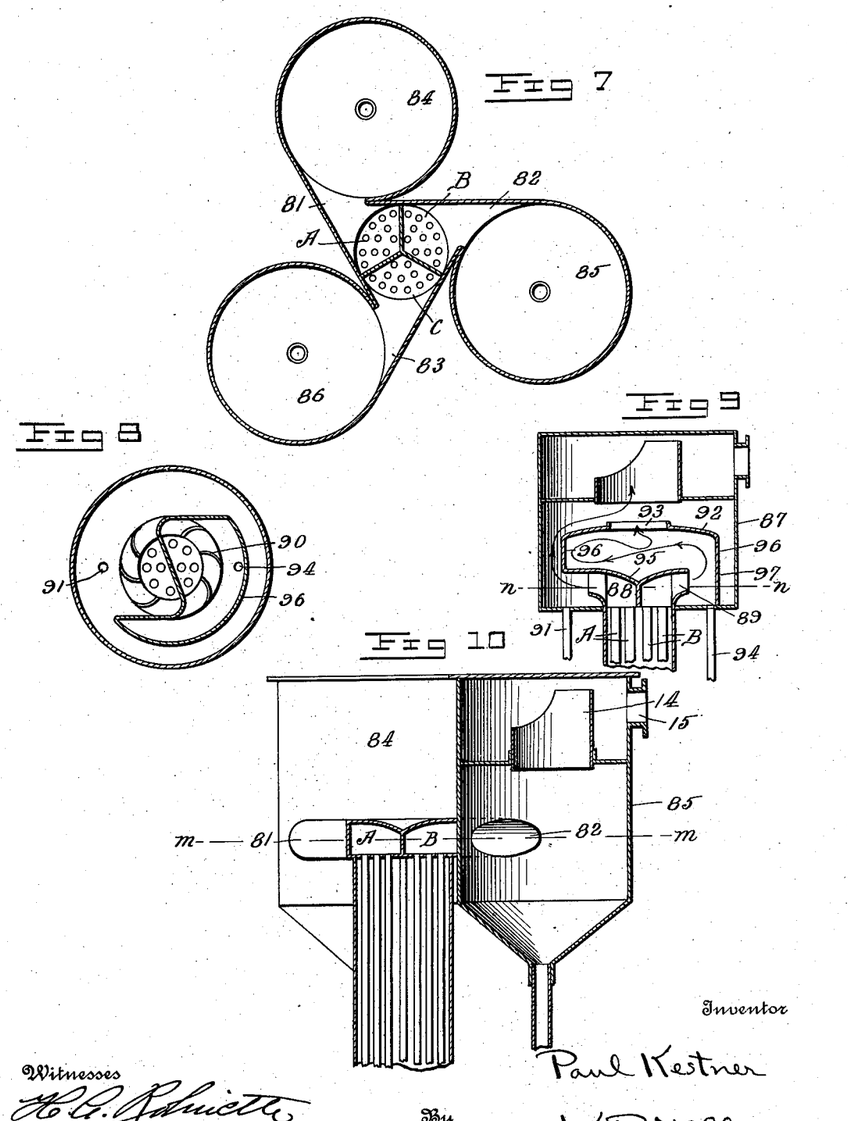
Fig. 7 is a horizontal section on line $m$—$m$, Fig. 10, of a modified form of vapor separator applied to an effect of the present improved type.
Fig. 8 is a horizontal section on line $n$—$n$, Fig. 9, of another form of vapor separator for a two-section effect.
Fig. 9 is a vertical section of the same.
Fig. 10 is a view partly in vertical section and partly in elevation of the separator of Fig. 7.

Referring first to Figs. 1, 2, 3, 4 and 5, showing for the purposes of illustration an evaporator of the climbing film type to which the present invention is particularly applicable, element 1 is a heating shell or chamber fed with heating vapor through 2. At the bottom and top this shell is spanned by cross headers 3 and 4. Through the bottom header the tubes extend as tubular prolongations, projecting downwardly into basal feed chambers. As shown, these prolongations are provided with laterally presented orifices, the tubes 5 being provided with a beveled end, as shown. This enables them to tap vapor and liquid simultaneously, vapor entering at one level and liquid at another simultaneously. This much contributes to uniformity of operation in a climbing film evaporator. Where such an evaporator is fed with heated liquid, on entering the feed chamber self-evaporation takes place with the formation of a layer of vapor above the liquid. As shown, there is a feed chamber 6 common to all the tubes and this feed chamber is provided with radial partitions 7 which may be in number sufficient to produce two or more compartments, thereby subdividing the evaporator tubes into a similar number of groups; one group for each such subchamber. Three compartments and three groups are convenient. At the upper ends, the evaporator tubes open into a hood 8 for the separation of liquid and vapor. As shown, the hood is divided into three chambers A, B and C by vertical partitions 10 extending to a point near its top. Each of these chambers corresponds to a group of evaporating tubes. Positioned some distance above the tops of the tubes is a horizontal cross-partition 11 of less diameter than the hood. The mixture of concentrated liquid and vapor emerging from the tops of the tubes in a group is caused to pass laterally into the hood by this partition, encountering a group of vertical angle irons 12 (Fig. 2) which act as baffling elements, causing a separation of liquid. Passing beyond these baffle elements, the vapors pass again against groups of angle irons 13 (Fig. 4) set in reverse position, giving a further separation. Liquid separated above the cross partition drains back through pipes 16. All these compartments (A, B and C) are open at the top, the radial partitions not extending the full height of the hood, and they open under an eccentrically placed vertical wing baffle 14, placed before the vapor outlet 15. Dams 15$^a$ prevent backward passage of liquid. As stated, the effect shown is subdivided into three groups of tubes corresponding to the upper subchambers A, B and C. Pipe connections are provided enabling these groups to be used in varied ways. Referring now more particularly to Fig. 5, the groups are provided, respectively, with inlets $a$, $b$ and $c$ to the lower chambers. From the upper chambers, return tubes 17, 18 and 19, respectively remove the separated liquid and may return it to the base of the next group in series. Since it is desirable to have both vapor and liquid in the basal chamber of evaporators of this type in order to facilitate the formation of the climbing film, and since the tubes of all the groups are heated to the same temperature and communicate with the same vacuum producing means, there is not a sufficient drop of pressure on the liquid coming from the top of one group and going to the base of the next group to cause much self-evaporation and formation of vapor to take place in such base. For this reason the return tube may be jacketed, as shown at 20 (return tube 17). When this heating is used it is advisable to give the return pipe a depending bend (not shown) to facilitate circulation. The first return tube (17) is provided with a pair of valves 22 and 23, between which is placed a T-connection 24, valved at 25 and functioning as a take-away conduit. The second return tube is similarly provided with valves 26 and 27, and T-connection 28, valved at 29; and the third return tube is provided with valves 30 and 31 and T-connection 32, valved at 33. Liquid may be brought to the apparatus through 34, having extensions, valved respectively at 35, 36 and 37, to each of the three inlets, $a$, $b$ and $c$. Other liquid may be simultaneously introduced by pipe 38 having extensions, valved respectively at 39, 40 and 41, to any of the three inlets. This pipe by shutting valve 38$^a$ may also serve as a cross-over conduit being provided with connections valved at 39$^a$, 40$^a$ and 41$^a$ with the three T-connection pipes. A cross-pipe 42, has communications, valved respectively at 43, 44 and 45, with each of the return tubes, with valves, respectively 46, 47 and 48, in such return tubes below the point of communication. Where the described multiple group effect is to be run in but one predetermined way of course many of these valves and tubes can be dispensed with; but the arrangement shown comprises connecgroup or groups, forms a convenient unit in a multiple effect system for another reason since it allows washing and cleansing of the evaporating surfaces *seriatim* without shutting down the whole apparatus. In a triple effect, for example, consisting of three multiple group evaporators with, say, three groups each, two groups in each evaporator can be operating while the third is being washed out. Each of the nine groups making up the three evaporators can be washed out in succession while the other eight groups are doing the work of evaporation. Referring to Figs. 1 and 2, for example, A and B may be working in series or in parallel while clean water is being run through C. Group C is of course as hot as A and B and the water runs through it rapidly cleansing it. In turn, evaporation may be shifted to B and C and A cleansed and so on through each of the evaporators. Another convenience in the use of multiple group evaporators in a multiple effect arrangement is that the system may at will be run at full capacity or less than full capacity. If each evaporator be provided with four groups, obviously the system may be run at full capacity, at three-quarter capacity, at half capacity, or at one-quarter capacity. This power to run at less than full capacity is often very convenient.

What I claim is:—

1. In an evaporator, a plurality of groups of evaporating tubes, a common heating chamber inclosing said plurality of groups, a common offtake for the vapor formed in all said groups and means for passing liquid to be evaporated successively or independently through said groups.

2. In an evaporator, three or more groups of evaporating tubes, a common heating chamber inclosing said groups, a common offtake for the vapors formed in all said groups, means for passing liquid to be evaporated successively through two such groups and means for passing liquid through another group independently of the circulation through the other said groups.

3. In a climbing film evaporator, a plurality of vertical evaporating tubes of a type adapted for climbing film evaporation, a common heating chamber surrounding said tubes, a lower casing inclosing depending ends of said tubes, a partition in said casing dividing it into subchambers communicating with groups of said tubes, an upper casing at the top, a partition in said latter casing dividing it into a plurality of subchambers communicating with corresponding groups of said tubes, means for feeding liquid to one of the lower subchambers and means for returning liquid from one of the upper subchambers to another of the lower subchambers.

4. In a climbing film evaporator, a plurality of vertical tubes, a heating chamber surrounding said tubes of a type adapted for climbing film evaporation, a surmounting hood having means for removing vapor from all said tubes, a casing inclosing depending ends of said tubes, a plurality of partitions in said casing dividing it into feeding subchambers for corresponding groups of tubes, a plurality of partitions in said hood dividing it into liquid-receiving subchambers communicating with corresponding groups of tubes, means for supplying liquid to one of said feeding subchambers and means for withdrawing liquid from the corresponding liquid-receiving subchamber.

5. In a climbing film evaporator, a plurality of vertical tubes, a heating chamber surrounding said tubes of a type adapted for climbing film evaporation, a surmounting hood having means for removing vapor from all said tubes, a casing inclosing depending ends of said tubes, a plurality of partitions in said casing dividing it into feeding subchambers for corresponding groups of tubes, a plurality of partitions in said hood dividing it into liquid-receiving subchambers communicating with corresponding groups of tubes, means for supplying liquid to one of said feeding subchambers and means for withdrawing liquid from the corresponding liquid receiving chamber and returning it to another feeding subchamber.

6. In an evaporator, a plurality of evaporating tubes, a common heating casing inclosing said tubes, a vapor exit withdrawing vapor from all said tubes and means for feeding liquid independently or in series through different groups of said tubes.

7. In an evaporator, a plurality of evaporating tubes, a common heating casing inclosing said tubes, a vapor exit withdrawing vapor from all said tubes and means for alternately feeding liquid in series through groups of said tubes or for feeding liquids independently in parallel through said groups.

8. In an evaporator of the climbing film type, a plurality of parallel vertical evaporating tubes, a surmounting hood having means for removing vapor from all said tubes, and means for feeding liquid independently or in series through different groups of said tubes.

9. In an evaporator of the climbing film type, a plurality of parallel vertical evaporating tubes, a surmounting hood having means for removing vapor from all said tubes, and means for alternately feeding liquid in series through groups of said tubes or for feeding liquids independently in parallel through said groups.

10. In an evaporator, a plurality of vertical evaporating tubes of a type adapted for climbing film evaporation, a heating chamber surrounding all said tubes, a liquid chamber inclosing depending ends of said tubes, partitions therein subdividing it into a plurality of subchambers into which different groups of tubes open, a surmounting hood having a vapor-removing outlet and vertical partitions in said hood extending to a point short of said outlet and dividing said hood into a plurality of liquid-receiving chambers corresponding to said groups of tubes.

11. In a climbing film evaporator, a plurality of relatively long vertical evaporating tubes, an inclosing heating chamber, a basal feed chamber into which depending laterally orificed prolongations open, a partition in said chamber dividing it into a plurality of subchambers corresponding to different groups of said tubes, a surmounting hood above the upper ends of said tubes, a partition in said hood dividing it into liquid-receiving subchambers corresponding to said tube groups, a feed connection to one of the basal subchambers and a liquid removing connection to the corresponding liquid-receiving upper subchamber.

12. In a climbing film evaporator, a plurality of relatively long vertical evaporating tubes, an inclosing heating chamber, a basal feed chamber into which depending laterally orificed prolongations open, a partition in said chamber dividing it into a plurality of subchambers corresponding to different groups of said tubes, a surmounting hood above the upper ends of said tubes, a partition in said hood dividing it into liquid-receiving subchambers corresponding to said tube groups, a feed connection to one of the basal subchambers, a liquid transmitting connection between the corresponding upper liquid receiving subchamber and another basal subchamber, and a liquid-removing connection from the upper liquid-receiving chamber corresponding to said other basal subchamber.

13. In a climbing film evaporator, a plurality of relatively long vertical evaporating tubes, an inclosing heating chamber, a basal chamber into which depend prolongations of said tubes having laterally presented orifices, partitions dividing said chamber into a plurality of subchambers corresponding to groups of said tubes, a hood chamber having an exit for vapor and located above the upper delivery ends of said tubes, partitions in said hood dividing it into liquid receiving subchambers corresponding to said groups, and pipe-connections enabling liquid to be transmitted upwardly through successive groups of tubes in series, liquid entering one of the basal subchambers and leaving from an upper liquid-receiving chamber.

14. In a climbing film evaporator, a plurality of relatively long vertical evaporating tubes, an inclosing heating chamber, a basal feed chamber into which depend prolongations of said tubes having laterally presented orifices, radial partitions dividing said chamber into at least three subchambers corresponding to an equal number of groups of said tubes, a surmounting hood having an exit for vapors and divided into an equal number of corresponding liquid receiving chambers by suitable partition and pipe connections by which liquid may be transmitted upwardly through two or three of said groups in series.

15. In a climbing film evaporator, a plurality of relatively long vertical evaporating tubes, an inclosing heating chamber, a basal feed chamber into which depend prolongations of said tubes having laterally presented orifices, radial partitions dividing said chamber into at least three subchambers corresponding to an equal number of groups of said tubes, a surmounting hood having an exit for vapors and divided into an equal number of corresponding liquid receiving chambers by suitable partitions and pipe connections by which liquid may be transmitted through two such groups in series while by-passing another group.

16. In a climbing film evaporator, a plurality of relatively long vertical evaporating tubes, an inclosing heating chamber, a basal feed chamber into which depend prolongations of said tubes having laterally presented orifices, radial partitions dividing said chamber into at least three subchambers corresponding to an equal number of groups of said tubes, a surmounting hood having an exit for vapors and divided into an equal number of corresponding liquid receiving chambers by suitable partitions and pipe connections by which a liquid may be transmitted through two such groups in series and pipe connections enabling the simultaneous employment of another group for evaporating liquid from another source of supply.

17. In an evaporator, a plurality of effects in multiple effect arrangement treating liquid in series, the last of said effects being of the climbing film type, having a plurality of relatively long vertical evaporating tubes and being provided with means for independent operation of each of a plurality of groups of said tubes, and there being pipe connections enabling liquid to be transmitted through one such group and thence to the feed inlet of the first effect in series while liquid from the next preceding effect is being concentrated in another such group.

18. In an evaporator of the climbing film type, a heating casing, a plurality of relatively long vertical evaporating tubes therein, basal feeding means, a surmounting vapor-separating hood casing, means for discharging the vapor and liquid emerging from the upper end of said tubes laterally within said hood and a plurality of vertical angle bars set within said hood in the path of said liquid and vapor.

19. In an evaporator of the climbing film type, a heating casing, a plurality of relatively long vertical evaporating tubes therein of a type adapted for climbing film evaporation, a plurality of basal feeding chambers communicating with corresponding groups of said tubes and inclosing depending ends of said tubes, a plurality of corresponding liquid receiving chambers communicating with the tops of said groups, a common vapor outlet for all said liquid receiving chambers and pipe connections enabling two or more such groups of tubes to be used serially or in parallel for the upward passage of liquid therethrough.

20. An evaporator comprising a plurality of effects in multiple effect arrangement, one such effect receiving liquid from an earlier effect and being provided with means for causing such liquid to circulate upwardly through a plurality of groups of evaporator tubes in series, said groups being inclosed in a common heating chamber receiving vapors from said earlier effect.

21. In an evaporator, a plurality of effects in multiple effect arrangement, the last of said effects comprising a plurality of groups of evaporating tubes in a common heating casing and pipe connections for allowing liquid from the next preceding effect to be circulated upwardly either serially or in parallel through two or more such groups.

22. In an evaporator, a plurality of effects in multiple effect arrangement, the last of said effects comprising a plurality of groups of evaporating tubes in a common heating casing and pipe connections for causing liquid from the next preceding effect to circulate upwardly through two such groups and pipe connections to transmit liquid upwardly through another such group and thence to the feed inlet of the first effect in series.

23. In an evaporator, a plurality of effects in multiple effect arrangement treating liquid in series and means for transmitting liquid over a portion of the heating elements of the last of said effects, and thence to the feed inlet of the first effect in series.

24. In an evaporator of the climbing film type, a plurality of relatively long vertical evaporating tubes, a heating casing surrounding said tubes, individual feeding means for supplying a plurality of groups of said tubes, a vapor hood surmounting the tops of said tubes, transverse vertical partitions in said hood forming a number of subchambers corresponding to said groups of tubes, a transverse septum spaced away from the hood walls and forming tops to said subchambers, a plurality of vertical angle irons disposed below said septum in the path of liquid and vapor discharged from each subchamber against the hood walls, and a plurality of vertical angle irons disposed above said septum in the path of vapor recoiling from said hood wall and passing back to the center of said hood above said septum.

25. In a climbing film evaporator, a plurality of relatively long vertical evaporating tubes, an inclosing heating chamber, a basal feed chamber into which the tubes open, a partition dividing said chamber into a plurality of subchambers corresponding to groups of said tubes, a surmounting hood having an exit for vapors and partitioned to form liquid receiving subchambers corresponding to said groups and pipe connections by which liquid may be passed serially through a plurality of such groups or through one such group while by-passing another group.

26. In a climbing film evaporator, a plurality of relatively long vertical evaporating tubes, an inclosing heating chamber, a basal feed chamber into which the tubes open, a partition dividing said chamber into a plurality of subchambers corresponding to groups of said tubes, a surmounting hood having an exit for vapors and partitioned to form liquid receiving subchambers corresponding to said groups and pipe connections enabling the simultaneous employment of different groups in the evaporation of liquids from different sources of supply.

27. In an evaporator, a plurality of groups of evaporating tubes, heating means common to all said groups, vapor removing means common to all said groups, individual means for supplying liquid to each such group and individual means for removing concentrated liquid from each such group.

28. In an evaporator, a plurality of groups of evaporating tubes, a heating casing surrounding all said tubes, individual liquid feeding means for each such group of tubes, individual liquid removing means for each such group of tubes and common vapor removing means for all said tubes.

29. In a climbing film evaporator, a plurality of groups of relatively long vertical evaporating tubes, a heating casing surrounding all said tubes, individual liquid feeding means at the base of each such group, individual liquid removing means at the top of each such group and common vapor removing means for all said tubes.

30. In a climbing film evaporator, a plurality of relatively long vertical evaporating tubes, an inclosing heating casing a basal feed chamber into which the tubes open, a partition dividing said chamber into a plurality of subchambers corresponding to groups of tubes, a surmounting hood having an exit for vapors and partitioned to form liquid-receiving subchambers corresponding to said groups, individual liquid supply means for each such basal subchamber and individual liquid-removing means for each such liquid-receiving chamber.

31. An evaporator comprising a plurality of effects in multiple effect arrangement, one such effect being provided with a plurality of groups of tubes inclosed in a common heating casing, each such group having connections enabling individual feed of liquid thereto and removal of concentrated liquid therefrom.

32. In an evaporator of the climbing film type, a plurality of groups of relatively long vertical evaporating tubes, an inclosing heating chamber, individual basal liquid supplying means for each said group, and an individual separator for liquid and vapor at the top of each such group, each such separator having a liquid outlet and all said separators communicating with common vapor removing means.

33. In an evaporator of the climbing film type, a heating casing, a plurality of relatively long vertical evaporating tubes therein, basal feeding means, a surmounting vapor-separating hood casing, means for discharging the vapor and liquid emerging from the upper end of said tubes laterally within said hood, a plurality of vertical angle bars set in the lateral path of said liquid and vapor, a horizontal septum above said bars extending to a point short of the hood walls and another plurality of angle bars above said septum.

In testimony whereof, I affix my signature in the presence of two subscribing witnesses.

PAUL KESTNER.

Witnesses:
 LÉON PECKEL,
 VICTOR KLAUSZMANN.

---

Copies of this patent may be obtained for five cents each, by addressing the "Commissioner of Patents, Washington, D. C."